United States Patent [19]

Van't Hof et al.

[11] Patent Number: 5,514,413

[45] Date of Patent: May 7, 1996

[54] PROCESS FOR PRODUCING COMPOSITE MEMBRANES

[75] Inventors: Jacob A. Van't Hof, Maryland Heights; Pushpinder S. Puri, Chesterfield; Stephen C. Lynch, Ballwin; Albert A. Brooks, St. Louis; Daniel T. Diggs, Maryland Heights, all of Mo.

[73] Assignee: Air Products and Chemicals, Inc., Allentown, Pa.

[21] Appl. No.: 221,326

[22] Filed: Mar. 31, 1994

[51] Int. Cl.[6] ............... B05D 3/00; B05D 5/00; B05D 7/24
[52] U.S. Cl. ............ 427/244; 427/246; 427/322; 427/377
[58] Field of Search ................. 427/246, 245, 427/244, 324, 378, 322, 377, 155, 398.4

[56] References Cited

U.S. PATENT DOCUMENTS

| | | | |
|---|---|---|---|
| 3,515,573 | 6/1970 | Japs et al. | 427/246 |
| 3,516,883 | 6/1970 | Harper | 427/378 |
| 3,620,811 | 11/1971 | Morrissey et al. | 427/246 |
| 3,762,566 | 10/1973 | Del Pico | 210/22 |
| 3,946,129 | 3/1976 | Jones | 427/378 |
| 4,071,590 | 1/1978 | Strathmann | 264/45.1 |
| 4,346,126 | 8/1982 | Kutowy et al. | 427/246 |
| 4,351,860 | 9/1982 | Yoshida et al. | 427/246 |
| 4,388,189 | 6/1983 | Kawaguchi et al. | 427/245 |
| 4,473,474 | 9/1984 | Ostreicher et al. | |
| 4,702,940 | 10/1987 | Nakayama et al. | 427/378 |
| 4,756,932 | 7/1988 | Puri | 427/175 |
| 4,784,880 | 11/1988 | Coplan et al. | 427/246 |
| 4,824,568 | 4/1989 | Allegrezza et al. | 427/246 |
| 4,826,599 | 5/1989 | Bikson et al. | 210/500 |
| 4,840,819 | 6/1989 | Williams et al. | 427/245 |
| 5,085,676 | 2/1992 | Ekiner et al. | 55/158 |
| 5,141,642 | 8/1992 | Kusuki et al. | 210/490 |
| 5,209,883 | 5/1993 | Chung et al. | 427/245 |
| 5,213,689 | 5/1993 | Kalchinski et al. | 210/500 |
| 5,242,636 | 9/1993 | Sluma et al. | 264/45.8 |

Primary Examiner—Diana Dudash
Attorney, Agent, or Firm—Mark L. Rodgers; William F. Marsh

[57] ABSTRACT

A process is provided for fabricating composite membranes by coating a porous substrate with a solution of selective polymer. A reserve of non-solvent medium is incorporated in the substrate pore network which allows the substrate to be successfully coated with a polymer solution formulated in a solvent medium which is also a solvent for the substrate material.

20 Claims, No Drawings

PROCESS FOR PRODUCING COMPOSITE MEMBRANES

FIELD OF THE INVENTION

The present invention relates to composite membranes and a process for fabricating such membranes.

BACKGROUND OF THE INVENTION

The most commonly used gas separation membranes consist of a polymeric material which is spun in the form of a hollow fiber or cast as a flat film in such a way that it has an integral dense skin supported on an open cell porous mass. Such a membrane is known as an asymmetric membrane. Alternately, gas separation membranes are also made by forming a very thin film of a permselective polymer on a microporous substrate. Such a composite membrane is generally formed by using two different polymers. The polymer used for the microporous support, also known as the substrate, is mechanically strong and chemically and thermally resistive. Substrate selection is generally predicated by its ability to resist the solvents which are used to dissolve the coating polymer. Therefore, a substrate polymer is typically chosen which is not swollen or dissolved by the coating solution. In the majority of cases, however, the coating polymer is soluble only in those solvents which are solvents for the substrate as well, thereby limiting the ability to make composite membranes from a wide variety of polymers.

Typically, composite membranes have been made by coating a pre-formed support, such as a flat sheet or hollow fiber, with a solution of the coating prepolymer or polymer followed by the removal of the solvent.

Purl, U.S. Pat. No. 4,756,932, teaches a process for applying a highly permeable coating on a hollow fiber substrate to produce a composite hollow fiber membrane. The hollow fiber substrate is passed through a polymeric solution capable of forming a coating on the substrate. After formation of the coating layer on the substrate, a portion of the solvent is removed by evaporation, followed by leaching in a non-solvent. It is specifically taught that the solution of polymeric coating material should be one which does not adversely react with or affect the substrate.

Bikson, et al., U.S. Pat. No. 4,826,599, disclose a process for producing hollow fiber membranes by coating a porous hollow fiber substrate with a dilute solution of a membrane forming material, partially evaporating the solvent, followed by coagulation and recovering the membrane. The solvents used in the coating solution are all non-solvents for the substrate. Kafchinski, et al., U.S. Pat. No. 5,213,689, disclose a method of coating polyolefin microporous hollow fibers by wet-spinning, or alternately by dry jet-wet spinning, through a spinning jet in which a fluoropolymer-containing fluid is applied to the outer surface of the fibers as they pass through the jet. In this process, the liquids used to dissolve the fluoropolymer are non-solvents for the polyolefin substrate.

Williams, et al., U.S. Pat. No. 4,840,819, disclose composite membranes prepared by applying a thin coating of a permeable membrane material to a porous base material having a controlled amount of liquid incorporated therein. Solvent from the coating is subsequently removed by drying. The presence of the liquid in the porous support layer precludes any appreciable penetration of the membrane material into the pores of the porous support layer.

Sluma, et al, U.S. Pat. No. 5,242,636 discloses a process for making a multilayer capillary membrane by guiding a hollow capillary support membrane through the central bore of a spinneret having one or several concentric annular slits through each of which a solution of one of the polymers forming the separating layer is applied.

The above-described prior art processes clearly indicate that certain combinations of coating polymer and substrate are not possible based on their solution characteristics and compatibility issues, especially where the solvency of the coating solution coincides with or falls within the solubility domain of the substrate material.

In addition to the above processes, several coextrusion techniques have been developed. Ekiner, et al., U.S. Pat. No. 5,085,676, disclose a process for preparing multicomponent membranes by casting two or more solutions of polymer and partially removing solvent from the side of the cast polymer that is to form the separation layer of the membrane. The membrane is then quenched to freeze its structure and the remainder of the solvent is then removed. Kusuki, et al., U.S. Pat. No. 5,141,642, disclose an aromatic polyimide double layered hollow filamentary membrane produced by concurrently extruding first and second spinning dope solutions through inner and outer annular openings in a hollow filament-spinning nozzle to form a double layered hollow filamentary stream and subsequently coagulating said stream to form a double-layered membrane.

The above coextrusion processes require coextrusion of two or more components for which the coagulation process can't be independently controlled which may result in difficulties in obtaining the desired membrane properties.

SUMMARY OF THE INVENTION

The present invention is a process for fabricating composite membranes wherein a porous substrate, i.e. support membrane is coated with a solution of permselective polymer formulated in a solvent medium which, under normal conditions, dissolves, partially dissolves, or adversely interacts with the substrate material. It is this ability to fabricate composite membranes using coating solutions normally expected to cause irreparable harm to the porous substrate which distinguishes this process from those of the prior art.

Such composite membranes are fabricated by forming a porous substrate membrane and incorporating a reserve of a non-solvent medium in the substrate membrane pore network and applying the coating solution onto the wetted substrate surface. After the coating solution is applied to the substrate, the coated membrane is passed through a coagulation bath, and additional wash baths if needed, to remove excess solvent and non-solvent media and is subsequently dried to form a composite membrane.

DETAILED DESCRIPTION OF THE INVENTION

A process is provided for fabricating composite membranes which have a highly porous polymeric substrate which provides strength and durability, and a thin coating layer designed to provide permselective properties. The advantage of the present process over those taught in the prior art is that the present process allows the porous polymeric substrate to be coated with a solution of permselective polymer formulated in a solvent medium which, under normal fabrication process conditions, dissolves, partially dissolves or adversely interacts; i.e. swells, softens, etc., with the substrate material.

The process comprises forming a polymeric substrate which meets the conventional requirements of strength, thermal stability, process compatibility and other such parameters for membrane substrates. Additionally, the substrate should also have sufficient porosity to ensure nominal resistance to gas transport as part of the composite membrane structure. Typically, surface porosity can be from 0.1 to 50% with a preferred range from 1 to 20%. Surface pore sizes range from about 0.01 to 10 μm, with a preferred range being from 0.05 to 1 μm. The cross-section of the substrate can be either isotropic or anisotropic. The substrate can be formed using any known conventional membrane fabrication technique, and can be formed from a wide range of polymeric materials. Examples of polymers which can be used to form the substrate include polysulfones, polyethersulfones, polyetherimides, polyphenylene oxides, polyamides, polycarbonates, polyesters, polyethers, polyacrylonitriles, polyimides, polyamidimides, polyvinylidene fluoride and the like, including copolymers and mixtures thereof. The substrate can be formed in any configuration suitable for membrane applications, including flat sheets, hollow fibers and hollow tubes. In the case wherein the substrate is in the form of a hollow fiber, the fiber may have an inside diameter from about 10 to 800 μm and an outside diameter from 15 to 1,200 μm, and have the desired mechanical attributes to withstand the separation conditions such as pressure, temperature and the like.

A non-solvent medium is incorporated into the pore structure of the polymeric substrate material. In addition to the pores, the non-solvent medium may also be present in any other void space within the support structure, such as in the lumen in the case of a hollow fiber substrate. It is the presence of this non-solvent which allows the present process to effectively fabricate composite membranes from normally incompatible substrate and coating solutions. The basic requirement for the non-solvent medium is that it must provide effective protection for the substrate until the coated composite structure is stabilized and most of the coating solvents are removed. The non-solvent medium must not substantially affect the substrate's permeability, and it should be miscible with the coagulation and wash medium to facilitate its removal from the composite membrane. The non-solvent medium can be a single component or a mixture of two or more components, and may or may not be volatile. Examples of components which may be included in the non-solvent medium which is incorporated into the porous membrane substrate include water, with or without surfactants or salts, methanol, isopropyl alcohol, glycols, glycerin, polyols, polyvinylpyrrolidone, polyethyleneglycol, other polymers, emulsions and the like. Such components may be included in the non-solvent medium to adjust the surface characteristics of the substrate, such as to improve coatability.

The non-solvent medium can be incorporated into the pore network of the substrate in a wide variety of ways, with the actual method of incorporation not being critical. If the substrate is manufactured in a wet state, such as with an aqueous medium, the liquid used in making the substrate may also serve as the non-solvent medium, eliminating the necessity of adding a second liquid. If this is the case, the present process can be carried out as a continuous manufacturing process where the substrate formation and coating operation are carried out sequentially; i.e., the coating solution is applied before the substrate is fully developed. If a non-solvent medium other than that from which the substrate is manufactured and stored is desired, the liquids may be exchanged using any conventional fluid exchange technique. If the substrate material is formed in a dry state, it can be either re-wet directly with the desired non-solvent medium or, if necessary, re-wet using a series of miscible non-solvent fluids as is commonly practiced in the industry.

Optionally, prior to being coated, the porous polymeric substrate may undergo a variety of treatments and/or modifications to improve coatability or otherwise change the characteristics of the substrate or resultant composite membrane. Examples of such treatments or modifications include surface drying, stretching, washing, heating, cooling, solvent exchange, incorporation of additives, removing a portion of the non-solvent medium or any other treatment which does not adversely affect the substrate or composite membrane. In carrying out these treatments, however, the amount of remaining non-solvent medium in the substrate must be sufficient to protect it from adverse effects of the coating solution.

After the non-solvent medium is incorporated into the pore network of the substrate, a coating solution is applied to the surface of said substrate. In the case of a hollow fiber substrate, the surface coating is typically applied to the outside of the fiber, however, in some processes it may be possible to coat the inside of the fiber or even both the inside and outside. The coating solution is characterized in that it comprises a permselective polymer material formulated in a solvent medium which is also a solvent for the polymeric substrate. The coating solution is made by dissolving the coating polymer at an appropriate concentration, typically, 1 to 40% and preferably 10 to 30% by weight, in a solvent medium for the substrate. The resulting coating solution should have characteristics, such as viscosity, surface tension and the like that, upon contact with the wet substrate, forms a continuous film. Control and optimization of such parameters can be carried out in accordance with known techniques. The coating solution is typically applied to the substrate using a coating die which can provide smooth and uniform delivery of the coating fluid. Contact time of the coating solution with the substrate in the coating die should be brief; i.e., from instantaneous to about 10 seconds, with from 0.001 to 1 second being preferred. The resulting coating layer can be dense or asymmetric in nature, with an asymmetric structure being preferred for gas separation applications. Additionally, either or both of the surfaces of the coating layer; i.e., the outer layer or the interface with the substrate, may contain a thin, dense skin, or alternatively a dense skin may be formed within the coating layer.

Typically, the overall coating layer has a thickness from about 1 to 100 microns, with a thickness of from 2 to 10 microns being preferred, while the effective coating thickness as measured by the flux rates, is typically from about 0.02 to 1.0 micron. Any coating polymers can be used which exhibit the required separation properties, such as flux and selectivity, for the desired end use application. Typical polymers suitable for a variety of gas separation applications include polyimides, polyamides, polyesters, polycarbonates, polysulfones, polyetherimides, polyphenylene oxides, and polyurethanes.

Optionally, the freshly coated substrate may subsequently be passed through a controlled gaseous environment for a limited amount of time, typically from about 0.01 to 5 seconds. The controlled environment can be dry or wet air, dry or wet nitrogen, carbon dioxide, argon, helium, or any other gas that does not adversely affect the substrate or the formation of the coating and may be at, above, or below ambient pressure and temperature. Residence time in the gaseous environment may be controlled to obtain the desired morphology in the coating. For example, for making a gas separation composite membrane, an air gap at atmospheric or sub-atmospheric pressure might be preferred. However, for other applications, one can use a set of conditions best suited for obtaining the desired structure.

After the coating solution has been applied to the surface of the substrate and optionally passed through a controlled gaseous environment as described above, the coated substrate is brought into contact with a coagulation liquid which is miscible with both the non-solvent medium in the substrate and the solvent medium in the coating solution. Optionally, the coagulation liquid may be of similar composition as the non-solvent medium incorporated in the substrate; however, in any event, it should be a non-solvent for the coated substrate. The characteristics of this coagulation liquid in relation to the coating solution should be such that the coagulated coating layer results in a structure of desired morphology. The coagulation liquid is then removed along with the solvent and non-solvent media to form a composite membrane. Typically, these liquids are removed by washing with a non-solvent medium or by any other conventional means. In some instances, however, special solvent/non-solvent exchange procedures may be required to remove some of the solvent in the structure. The composite membrane may subsequently be dried, either using a drying means or by exposure to air. The resultant composite membrane is then incorporated into a separation module for the desired application.

The following examples are presented to better illustrate the present invention and are not meant to be limiting.

Examples 1–6 below are embodiments of the present invention wherein a coating solution is applied to a pre-spun fiber. In all six Examples, the coating solution used would, under normal circumstances, be expected to dissolve or adversely effect the substrate.

EXAMPLE 1

A porous hollow fiber substrate was prepared by extruding a 25 wt. % solution of a polyacrylonitrile copolymer (PAN Type X, Bayer) in dimethyl sulfoxide (DMSO)/water (71/4) through a tube-in-orifice spinnerette into an air gap, followed by quenching in a water bath of 60° C. After coagulation the fiber was annealed in water at 70° C. for 4 minutes, collected on a spool and washed in 50° C. water for 24 hrs. Fibers were stored in a water saturated environment at ambient temperature until further use. Dried samples of this fiber had nitrogen permeance of $1\times10^{-2}$ $cm^3(STP)/cm^2.s.cmHg$.

The water-wet support fiber was fed through a coating die, through which a 25 wt. % polyetherimide (Ultem®-1000, GE Plastics, Schenectady, N.Y.) solution in a 1:1 mixture (weight ratio) of N-methylpyrrolidinone (NMP) and tetrahydrofuran (THF) was extruded simultaneously. After passing through an air gap for 1.3 seconds, the coated substrate was coagulated in a water bath at 1° C., washed at 60° C. and collected as 30 cm long strands. After overnight washing in water at 40° C. the composite membranes were dried under ambient conditions. Test bundles of 20 fibers and 20 cm length were prepared and coated with Sylgard 184 (Dow Corning) to seal defects (as taught in U.S. Pat. No. 4,230,463). The test bundles were tested with pure oxygen and nitrogen at 30° C. and 90–175 psig, resulting in the following:

$(P/l)O_2 = 0.81\times10^{-6}$ $cm^3(STP)/cm^2.s.cmHg$

Selectivity $O_2/N_2 = 6.5$.

Electron micrographs showed an asymmetric coating structure, with a dense skin of about 0.4 µm on the outside, and a porous structure under this skin.

EXAMPLE 2

Composite membranes were made under the same conditions as described under Example 1, above except that the coating solution consisted of 21.6 wt. % polyimide (Matrimid® 5218, Ciba Geigy Corporation, Hawthorn, N.Y.) dissolved in a 1:1 mixture (weight ratio) of N-methylpyrrolidinone (NMP) and tetrahydrofuran (THF). The time in the air gap was 0.3 seconds and the water coagulation bath was at 18° C. Composites thus obtained were handled and tested under the same conditions as those in Example 1 and had the following properties after defect repair with Sylgard 184:

$(P/l)O_2 = 4.0\times10^{-6}$ $cm^3(STP)/cm^2.s.cmHg$

Selectivity $O_2/N_2 = 7.0$.

Electron micrographs showed an asymmetric coating structure with an outside dense skin of 0.3–0.4 µm and a porous structure under this skin.

EXAMPLE 3

A porous substrate fiber was made from a 25 wt. % solution of Ultemr®-1000 in NMP and propionic acid (PA) (74/26, weight ratio) as in Example 1. Dried samples of this fiber had nitrogen permeance of $2.2\times10^{-2}$ $cm^3(STP)/cm^2.s.cmHg$.

The water-wet support fiber was coated with Matrimid® as in Example 2, with the exception that the time in the air gap was 0.4 seconds and the coagulation bath was at 9.5° C. Following defect repair with Sylgard 184 as in Example 1, the fiber properties were:

$(P/l)O_2 = 3.6\times10^{-6}$ $cm^3(STP)/cm^2.s.cmHg$

Selectivity $O_2/N_2 = 7.3$.

Electron micrographs showed an asymmetric coating structure, with a dense skin of about 0.4 µm on the outside, and a porous structure under this skin.

EXAMPLE 4

A substrate hollow fiber was prepared by extruding a 25 wt. % solution of a Udel P3500 polysulfone (Amoco) in NMP and polyethyleneglycol (PEG200) (52/48, weight ratio) through a tube-in-orifice spinnerette into an air gap, followed by quenching in water at 23° C., and washing at 36°–40° C. Dried samples of this fiber had nitrogen permeability of $1.3\times10^{-2}$ $cm^3(STP)/cm^2.s.cmHg$. The water-wet support fiber was coated with Matrimid® and repaired as in Example 2, with the exception that the coagulation bath was at 15.5° C. Measured composite fiber properties were:

$(P/l)O_2 = 8.0\times10^{-6}$ $cm^3(STP)/cm^2.s.cmHg$

Selectivity $O_2/N_2 = 6.3$.

Electron micrographs showed an asymmetric coating structure.

EXAMPLE 5 (Comparative)

A porous hollow fiber substrate fiber was made by spinning a solution of 30 wt. % Udel P3500 in NMP/PEG200 (52:48, weight ratio) into a water quench bath at 41° C., followed by washing in a water bath of 51° C. The fiber was collected on a spool and washed overnight in water at 60° C. The spool was then placed in an air-circulating oven and dried at 50°–60° C. for 5 hours. Samples of this fiber had nitrogen permeability of $2\times10^{-2}$ cm$^3$/cm$^2$.s.cmHg.

The dry substrate fiber was coated and handled as in Example 4. Examination by electron microscopy revealed severe deformation of the outer layer of the substrate fiber. Samples of this composite had oxygen permeability of only $0.4\times10^{-6}$ cm$^3$/cm$^2$.s.cmHg and oxygen/nitrogen selectivity of 5.5, after defect repair. This Comparative Example clearly demonstrates the protective effect of the non-solvent medium in the substrate fiber.

EXAMPLE 6 (Comparative)

Composite membranes were made as in Example 5, with the exception that after coating, the coated substrate fiber was dried for about 20 seconds before collection on a winder. After overnight washing in water at 50°–60° C. and drying at 50°–60° C. severely curled samples were obtained. Electron microscopy showed an even greater extent of densification of the substrate. This Example further demonstrates the criticality of incorporating a non-solvent medium in the substrate fiber.

Examples 7–10 below illustrate embodiments of the present invention wherein the coating solution is applied sequentially in a continuous process with the substrate formation; i.e. the coating solution is applied before the substrate is fully developed. In all of these examples, the non-solvent liquid incorporated into the pore structure of the substrate is the same liquid which was used in the formation of the substrate. As in the above examples, the coating solution, under typical fabrication techniques, would be expected to dissolve or adversely effect the substrate.

EXAMPLE 7

A polymer dope, containing 25 wt. % Ultem®-1000 in NMP/PA (70:30 weight ratio) was extruded through a tube-in-orifice spinnerette into an air gap followed by quenching in water of 30° C. After a 60° C. water wash bath the fiber was fed through a coating die, containing a 21.6 wt % solution of Matrimid® polyimide in NMP/THF (1:1, weight ratio). After passing through an air gap for 0.3 seconds the coated substrate was quenched in water (22.5° C.), washed in a water bath (60° C.) and collected. Test bundles containing 40 fibers each were tested with pure oxygen and nitrogen as in Example 1, resulting in the following:

$(P/l)O_2=7.8\times10^{-6}$ cm$^3$/cm$^2$.s.cmHg

Selectivity $O_2/N_2$=6.5

EXAMPLE 8

A polymer dope, containing 29 wt. % Udel P3500 in NMP/PA (57:43, weight ratio) was extruded through a tube-in-orifice spinnerette into an air gap followed by quenching in water of 49° C. After a 52° C. water wash bath the fiber was fed through a coating die, containing a 21.6 wt. % solution of Matrimid® in NMP/THF (2:1, weight ratio). After passing through an air gap the coated substrate fiber was quenched in water (22° C.), washed in a water bath (53° C.) and collected. Test bundles made and tested as in Example 1 had the following properties:

$(P/l)O_2=9.2\times10^{-6}$ cm$_3$/cm$_2$.s.cmHg

Selectivity $O_2/N_2$=6.7

Electron micrographs showed an asymmetric coating structure, with a dense skin on the outside and a porous structure under this skin. In order to prove that resistance to separation was primarily due to the skin on the exterior of the coating, a cold oxygen plasma was used to remove the outside skin, using a radio frequency of 14 MHz, 40 Watt power, and air at a pressure of 100 milli torr and 22°–24° C. in a bell jar. Membrane characterization in this way is described by Fritzsche et al., Journal of Applied Polymer Science, Vol. 40, 19–40 (1990). After only 10 minutes of ablation time the composite had lost all of its selectivity, indicating a selective layer on the exterior of the Matrimid® coating (a rough estimate is that in 10 minutes ablation time about 0.15–0.2 μm of coating is removed, which is only a fraction of the total coating thickness).

EXAMPLE 9

A polymer dope, containing 25 wt. % Udel P3500 in NMP/PEG 200 (52:48, weight ratio) was extruded through a tube-in-orifice spinnerette into an air gap followed by quenching in water of 40° C. After a 60° C. water wash bath the fiber was coated as in Example 8, with the exception that the time in the air gap was 0.6 seconds, the quench bath was 58° C. and the wash bath was 59° C. Furthermore, prior to drying, the composites were washed in methanol for one hour at ambient conditions. Testing of the Sylgard coated test bundles under conditions as in Example 1 gave the following:

$(P/l)He=105\times10^{-6}$ cm$^3$/cm$^2$.s.cmHg $(P/l)O_2=7.2\times10^{-6}$ cm$^3$/cm$^2$.s.cmHg Selectivity He/N$_{2=101}$ Selectivity O$_2$/N$_{2=6.9}$ Scanning electron microscopy showed a similar structure as in Example 8, and upon ablation experiments (performed as in Example 8) a complete loss of selectivity after 10 minutes ablation time was observed.

EXAMPLE 10

Example 9 was repeated with the exception that the substrate was coated with a solution of 9.1 wt. % ethyl cellulose (Ethocel S 100, Dow Chemical Co.) in NMP/THF (2:1, weight ratio). The coated substrate was passed through air for 0.6 seconds, followed by immersion in a water quench bath (temperature 8° C.) followed by a water wash bath at 58° C., and was subsequently collected on a winder. A smooth coating was obtained by this process.

EXAMPLE 11 (comparative)

A composite membrane was prepared under the same conditions as in Example 10 above, with the exception that the coated fiber was not immersed in a coagulation liquid but rather was simply allowed to dry as taught by Williams, et al. U.S. Pat. No. 4,840,819. After about 6 seconds drying time the composite fiber broke apart and could not be collected on the winder. This clearly demonstrates the criticality in the present process of contacting the coated fiber with a coagulation liquid prior to drying.

Having thus described the present invention, what is now deemed appropriate for Letters Patent is set out in the following appended claims.

We claim:

1. A process for producing a composite gas separation membrane which comprises:
   a) forming a porous polymeric substrate;
   b) providing a rescue of a non-solvent aqueous medium in the pore network of the substrate which serves to protect said substrate from subsequently applied coating solutions which contain solvents for the substrate;
   c) applying a coating solution onto a surface of the substrate, wherein said coating solution comprises a permselective polymer material formulated in a solvent medium which is also a solvent for the polymeric substrate, to form a coated substrate;
   d) bringing said coated substrate into contact with a coagulation liquid which is miscible with both the non-solvent medium and the solvent medium used above; and
   e) removing said coagulation liquid along with said non-solvent and solvent media to form a composite membrane.

2. The process of claim 1 wherein said porous polymeric substrate is in the form of a hollow fiber.

3. The process of claim 1 wherein said non-solvent aqueous medium in the pore network of the substrate is liquid which is present from the process used in forming the substrate.

4. The process of claim 3 wherein the formation and subsequent coating of said porous polymeric substrate are carried out in one continuous, sequential on-line process.

5. The process of claim 4 wherein the coating solution is applied to the porous polymeric substrate prior to said substrate being fully developed.

6. The process of claim I wherein said porous polymeric substrate is formed from a polymer selected from the group consisting of polysulfones, polyethersulfones, polyetherimides, polyphenylene oxides, polyamides, polycarbonates, polyesters, polyethers, polyacrylonitriles, polyimides, polyamidimides, polyvinylidene fluoride and mixtures thereof including copolymers.

7. The process of claim 1 wherein after coagulation, the coated substrate is washed with a medium which is a non-solvent for the coated substrate.

8. The process of claim 7 wherein said washed coated substrate undergoes a drying step.

9. The process of claim 1 wherein said permselective polymer material in the coating solution is selected from the group consisting of polyimides, polyamides, polyesters polysulfones, polyetherimides, polyphenylene oxides, polyurethanes and polycarbonates.

10. The process of claim 1 wherein the porous substrate and the coating solution comprise the same polymer material.

11. The process of claim 1 wherein said process results in a composite membrane which has a polymeric coating layer having a thickness from about 1 to 100 microns.

12. The process of claim 11 wherein said coating has a thickness from about 2 to 10 microns.

13. The process of claim 1 wherein said coated porous substrate is passed through a controlled gaseous environment prior to contacting the coagulation liquid.

14. The process of claim 13 wherein said coated porous substrate is passed through said controlled gaseous environment for about 0.01 to 5 seconds.

15. The process of claim 13 wherein said controlled gaseous environment is selected from the group consisting of dry air, wet air, dry nitrogen, or wet nitrogen.

16. The process of claim 11 wherein said polymeric coating layer is asymmetric.

17. The process of claim 16 wherein a skin is formed on one or both sides of the coating layer.

18. The process of claim 16 wherein a skin is formed within the coating layer.

19. The process of claim 1 wherein after said non-solvent aqueous medium is provided in the pore network of the substrate, and prior to applying the coating solution, said substrate is subjected to one or more additional treatment steps selected from the group consisting of stretching, washing, cooling, solvent exchange, incorporation of additives and mixtures thereof.

20. In a process for producing a composite gas separation membrane wherein a porous polymeric substrate is coated with permselective polymer material in a solvent and the solvent removed, the improvement for producing said composite membrane wherein the solvent for the permselective polymer material is a solvent for the porous polymeric substrate which comprises:
   a) providing a non-solvent aqueous medium within the pore network of the porous polymeric substrate thereby forming a pore filled, porous polymeric substrate;
   b) coating the pore filled, porous polymeric substrate with said permselective polymer material in a solvent which is also a solvent for the porous polymeric substrate to form a coated, pore filled, porous polymeric substrate;
   c) contacting the coated, pore filled, porous polymeric substrate with a coagulation liquid which is miscible with both the non-solvent aqueous medium and the solvent; and
   d) removing the coagulation liquid along with at least a portion of the non solvent aqueous medium and the solvent, thereby forming said composite membrane.

* * * * *

UNITED STATES PATENT AND TRADEMARK OFFICE
CERTIFICATE OF CORRECTION

PATENT NO. : 5,514,413

DATED : May 7, 1996

INVENTOR(S) : Jacob A. Van't Hof  et al.

It is certified that error appears in the above-identified patent and that said Letters Patent is hereby corrected as shown below:

Column 9, Line 8, Claim 1b)
  Delete the word "rescue" and replace it with --reserve--

Column 9, Line 23, Claim 1e)
  Insert the phrase --aqueous medium-- after the word "non-solvent"

Signed and Sealed this

Twenty-seventh Day of August, 1996

Attest:

BRUCE LEHMAN

*Attesting Officer*    *Commissioner of Patents and Trademarks*